(12) United States Patent
Yamamoto

(10) Patent No.: US 8,562,474 B2
(45) Date of Patent: Oct. 22, 2013

(54) SPEED REDUCER, ROBOT HAND AND ROBOT

(75) Inventor: Sota Yamamoto, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/424,841

(22) Filed: Mar. 20, 2012

(65) Prior Publication Data

US 2012/0244981 A1     Sep. 27, 2012

(30) Foreign Application Priority Data

Mar. 22, 2011   (JP) ................................ 2011-062532

(51) Int. Cl.
*F16H 3/70*         (2006.01)

(52) U.S. Cl.
USPC .......................................... 475/170; 475/178

(58) Field of Classification Search
USPC ................................. 475/162–180
See application file for complete search history.

(56) References Cited

U.S. PATENT DOCUMENTS

| | | | |
|---|---|---|---|
| 3,013,447 A | 12/1961 | Hils et al. | |
| 3,430,523 A | 3/1969 | Merritt | |
| 3,994,187 A | 11/1976 | Milenkovic | |
| 4,612,822 A | 9/1986 | Nishikawa et al. | |
| 4,619,156 A | 10/1986 | Kiryu | |
| 4,799,396 A | 1/1989 | Ito | |
| 4,803,891 A | 2/1989 | Takahashi | |
| 4,898,065 A | 2/1990 | Ogata et al. | |
| 5,725,452 A | 3/1998 | Droulon et al. | |
| 6,021,686 A | 2/2000 | Mizoguchi | |
| 6,155,950 A * | 12/2000 | Minegishi et al. | 475/178 |
| 6,378,206 B1 | 4/2002 | Minegishi et al. | |
| 6,450,913 B1 | 9/2002 | Strowik et al. | |
| 6,561,306 B2 | 5/2003 | Watanabe et al. | |
| 6,857,785 B2 | 2/2005 | Takahashi et al. | |
| 7,303,499 B2 | 12/2007 | Klindworth | |
| 7,308,876 B2 | 12/2007 | Schafer et al. | |
| 7,316,211 B2 | 1/2008 | Klindworth | |
| 7,351,177 B2 | 4/2008 | Christ | |
| 7,360,464 B2 | 4/2008 | Xue et al. | |
| 7,901,317 B2 | 3/2011 | Yamamoto et al. | |
| 8,047,943 B2 * | 11/2011 | Nakamura | 475/178 |
| 2010/0009801 A1 | 1/2010 | Nakamura | |
| 2010/0113206 A1 | 5/2010 | Wang et al. | |

FOREIGN PATENT DOCUMENTS

| | | |
|---|---|---|
| JP | 59-106744 | 6/1984 |
| JP | 59-231242 | 12/1984 |
| JP | 60-095235 | 5/1985 |
| JP | 63-199944 | 8/1988 |
| JP | 63-225746 | 9/1988 |
| JP | 02-120553 | 5/1990 |
| JP | 04-290643 | 10/1992 |
| JP | 04-290644 | 10/1992 |

(Continued)

*Primary Examiner* — Tisha Lewis
(74) *Attorney, Agent, or Firm* — Harness, Dickey & Pierce, P.L.C.

(57) ABSTRACT

Through holes are formed in a revolving gear which revolves while being engaged with a ring gear, and penetration pins for extracting rotation of the revolving gear are inserted in the through holes. The inner circumference of each through hole has a shape which becomes narrow toward its one end. A sliding member having a shape which becomes thin toward its one end is engaged with each penetration pin. The sliding member is biased in a tapered direction thereof by a biasing member to be in contact with the inner circumference of the through hole.

9 Claims, 8 Drawing Sheets

(56) References Cited

FOREIGN PATENT DOCUMENTS

| | | |
|---|---|---|
| JP | 05-079537 | 3/1993 |
| JP | 05-296301 | 11/1993 |
| JP | 07-253119 | 10/1995 |
| JP | 08-240258 | 9/1996 |
| JP | 08-303558 | 11/1996 |
| JP | 11-082041 | 3/1999 |
| JP | 2000-130521 | 5/2000 |
| JP | 2000-240763 | 9/2000 |
| JP | 2001-163229 | 6/2001 |
| JP | 2002-235825 | 8/2002 |
| JP | 2002-362385 | 12/2002 |
| JP | 2003-247631 | 9/2003 |
| JP | 2003-341530 | 12/2003 |
| JP | 2004-225732 | 8/2004 |
| JP | 2006-503214 | 1/2006 |
| JP | 2006-503237 | 1/2006 |
| JP | 2006-029393 | 2/2006 |
| JP | 2007-196980 | 8/2007 |
| JP | 2007-198445 | 8/2007 |
| JP | 2007-240003 | 9/2007 |
| JP | 2008-240852 | 10/2008 |
| JP | 2009-092220 | 4/2009 |
| JP | 2009-103276 | 5/2009 |
| JP | 2009-108964 | 5/2009 |
| JP | 2009-161073 | 7/2009 |

* cited by examiner

SPEED REDUCER, ROBOT HAND AND ROBOT

BACKGROUND

1. Technical Field

The present invention relates to a speed reducer which reduces an input rotational speed to be output.

2. Related Art

Most of the power obtained from a power source such as a motor is too high in its rotational speed or is insufficient to be used as it is. In this respect, a technique has been typically used in which the rotational speed is reduced to an appropriate rotational speed using a speed reducer to generate a necessary rotational number and a necessary torque.

As a speed reducer which obtains a large reduction ratio, the following one has been proposed. That is, a revolving gear which has a smaller size than a ring gear and has a smaller number of teeth (for example, by one tooth) than the ring gear is installed inside the ring gear. A circular cam is installed to be able to rotate with respect to the revolving gear in the central position of the revolving gear. A first rotational shaft is vertically installed in the circular cam in a position on the central axis of the ring gear. If the circular cam rotates around the central axis of the ring gear by the first rotational shaft, the revolving gear revolves around the central axis of the ring gear while being engaged with the ring gear. In such a configuration, during the revolution of the revolving gear around the central axis of the ring gear one turn, the revolving gear rotates in a direction opposite to its revolving direction by a teeth number difference with the ring gear. Thus, by extracting the rotating motion of the revolving gear, it is possible to considerably reduce the input rotational speed (rotational speed of the first rotational shaft).

The rotating motion of the revolving gear is extracted by a through hole formed in the revolving gear and a penetration pin inserted in the through hole. A clearance is formed between the through hole and the penetration pin. The rotating motion of the revolving gear is extracted by the penetration pin while the revolving motion of the revolving gear is being absorbed by the clearance. The rotating motion of the revolving gear extracted by the penetration pin in this way is output to the outside through a second rotational shaft to which the penetration pin is connected (JP-A-2008-240852).

However, in JP-A-2008-240852 as described above, there is a problem that a backlash easily occurs. That is, during the outputting through the second rotational shaft of the input of the first rotational shaft, in addition to a normal backlash occurring in a portion where the ring gear and the revolving gear are engaged with each other, a backlash also occurs in a portion where the through hole and the penetration pin of the revolving gear are in contact with each other. The latter backlash occurs due to a manufacturing error in the speed reducer having an operation principle of JP-A-2008-240852, which easily causes a large backlash as a whole corresponding thereto. As a result, there is a problem that a period occurs during which an output torque is not obtained with respect to the input of the first rotational shaft, or a large rattling is generated in the second rotational shaft. For this reason, the size of the backlash is inspected after assembly, and if there is a problem, the speed reducer is disassembled, a specific component is exchanged into a component having a slightly different dimension, the speed reducer is assembled again, and the backlash is then inspected. By repeating these processes, it is possible to achieve a speed reducer having a backlash of a predetermined size or less. Alternatively, the dimensions of the entire components are measured and selected in advance, and the speed reducer is assembled with the components combined so that a gap may not occur between the through hole and the penetration pin in assembly, which results in a considerably long time in assembly.

SUMMARY

An advantage of some aspects of the invention is to provide a speed reducer which is capable of suppressing or avoiding a backlash from occurring in a portion where a through hole and a penetration pin of a revolving gear are in contact with each other, without selection of component dimensions or assembly inspection, even with components having manufacturing errors.

An aspect of the invention is directed to a speed reducer including: a ring gear which is formed with a plurality of gear teeth on the inner circumference thereof; a revolving gear which is formed with a plurality of gear teeth on the outer circumference thereof and is engaged with the ring gear; a circular cam which is disposed to be able to rotate with respect to the revolving gear in a central position of the revolving gear; a first rotational shaft which is installed in the circular cam, is disposed on the central axis of the ring gear, and rotates the circular cam around the central axis to revolve the revolving gear around the central axis; a penetration pin which is inserted in a through hole formed in the revolving gear; a second rotational shaft which is disposed on the central axis of the ring gear, is connected to the penetration pin, and outputs its rotation according to the rotation of the revolving gear; a sliding member which has a hollow circular tube shape, is engaged with the outer circumference of the penetration pin to be able to slide thereon, and has a shape which becomes thin toward its one end; and a biasing member which biases the sliding member in a direction where the shape becomes thin to be in contact with the inner circumference of the through hole, wherein the inner circumference of the through hole of the revolving gear has a tapered shape.

In the speed reducer with such a configuration, if the circular cam rotates around the central axis of the ring gear by the first rotational shaft, the revolving gear revolves around the central axis while being engaged with the ring gear. Further, as described later in detail, the revolving gear rotates a little (by an angle corresponding to a teeth number difference between the ring gear and the revolving gear) in a direction which is opposite to its revolving direction while revolving. The rotating motion of the revolving gear is transmitted to the penetration pin which is inserted in the through hole of the revolving gear. The rotation of the revolving gear transmitted to the penetration pin in this way is reduced in speed with respect to an input rotation. The speed reduced rotation is output through the second rotational shaft connected to the penetration pin. Further, in the speed reducer according to this aspect of the invention, the inner circumference of the through hole is formed to have the shape which becomes narrow toward its one end. Further, the penetration pin is inserted in the sliding member of the circular tube shape. The sliding member is formed to have the shape which becomes thin toward its one end, and thus, the "circular tube shape" of the sliding member according to this aspect of the invention also includes a shape which is not a perfect circular tube shape. As an example of the shape which is not the perfect circular tube shape, a shape in which a claw-like portion is formed on the inner circumference of the sliding member to fix the penetration pin, a shape in which a non-circular portion is formed in a part of the outer circumference of the sliding member, or the like may be used. This sliding member is biased in the direction where the shape becomes thin by the biasing member, and is thus in contact with the through hole having the shape which becomes narrow toward its one end.

As an example of the shape of the sliding member in this aspect of the invention, a circular truncated shape which has a through portion formed from one end surface thereof to the other end surface thereof may be used, wherein the outer circumference of the penetration pin is inserted in the through portion to be able to slide therein. Further, as an example of the shape of the inner circumference of the through hole in this aspect, a tapered shape may be used.

Since the sliding member is pressed against an inclined surface of the shape which becomes narrow in the through hole, even in a case where the inclined surface of the through hole is formed to be spaced from the penetration pin due to a manufacturing error, the sliding member moves to be pressed against the inclined surface of the through hole. Thus, a state where the sliding member and the through hole are in contact with each other is maintained, and it is thus possible to suppress or avoid a backlash from occurring between the penetration pin and the through hole. Further, in a case where the inclined surface of the through hole is formed to be close to the penetration pin by a manufacturing error or the like, a force which pushes up the sliding member from the inclined surface of the through hole is generated. Since the sliding member and the penetration pin are not fixed to each other, the sliding member which receives this force moves in a direction of retreating from the through hole. In this way, in the speed reducer according to this aspect of the invention, even though the distance between the penetration pin and the through hole is changed due to a manufacturing error of the penetration pin, the through hole or the like, the distance change is absorbed as the sliding member slides, and it is thus possible to maintain the state where the penetration pin and the through hole are in contact with each other through the sliding member. Thus, even in a case where components having manufacturing errors are used, it is possible to suppress or avoid a backlash from occurring between the through hole and the penetration pin of the revolving gear, without selection of component dimensions or assembly inspection.

Further, in the above-described speed reducer according to this aspect of the invention, the through hole may be formed by inserting a different member into the revolving gear.

If the through hole is formed by inserting the different member into the revolving gear in this way, for example, it is possible to form the different member with a material which is different from that of the revolving gear, thereby enhancing the degree of freedom for material selection. For example, it is possible to form only a portion of the through hole in the revolving gear with a material which is superior in abrasion resistance. Further, if only the portion of the through hole is formed of the material which is different from that of the revolving gear, it is also possible to enhance the shape precision of the through hole.

Further, the above-described speed reducer according to this aspect of the invention can realize a large reduction ratio and can suppress or avoid occurrence of a backlash between the through hole and the penetration pin to suppress an output delay or rattling of the second rotational shaft, and thus is particularly effective as a speed reducer used in combination with a robot or a robot hand.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments will be described in the following order, in order to clarify the content of the invention.

A. Configuration of speed reducer according to embodiment of the invention

B. Principle of removing gap between through hole and penetration pin

C. Modified example

D. Application example

A. Configuration of Speed Reducer According to Embodiment of the Invention

Figure 1:
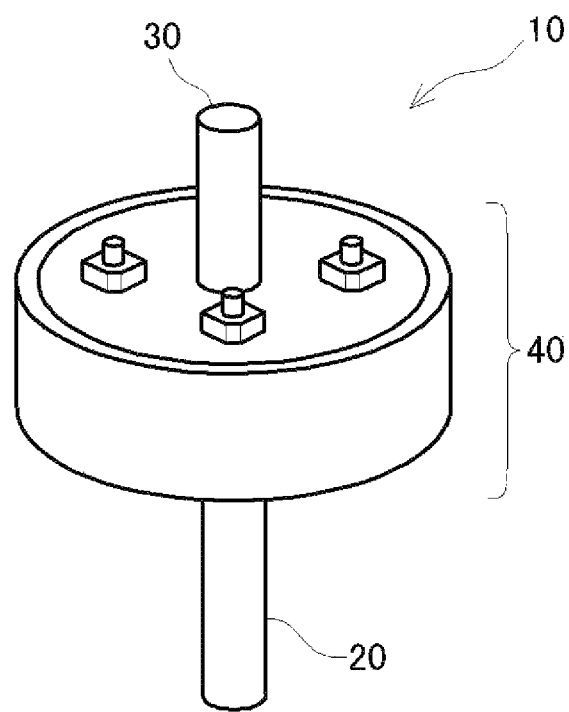
FIG. 1 is a diagram illustrating an appearance of a speed reducer according to an embodiment of the invention.

FIG. 1 is a diagram illustrating an appearance of a speed reducer 10 according to an embodiment of the invention. As shown in FIG. 1, the speed reducer 10 of the present embodiment includes an input shaft 20 (first rotational shaft) which is installed on a bottom surface side of a cylindrical main body section 40, and an output shaft 30 (second rotational shaft) which is installed on an upper surface side of the main body section 40. If the input shaft 20 is rotated in a state where the main body section 40 is fixed, its rotation is reduced in speed by a mechanism in the main body section 40 and is output through an upper cover plate 104 or the output shaft 30 which is fixed in the center of the upper cover plate 104.

Figure 2:
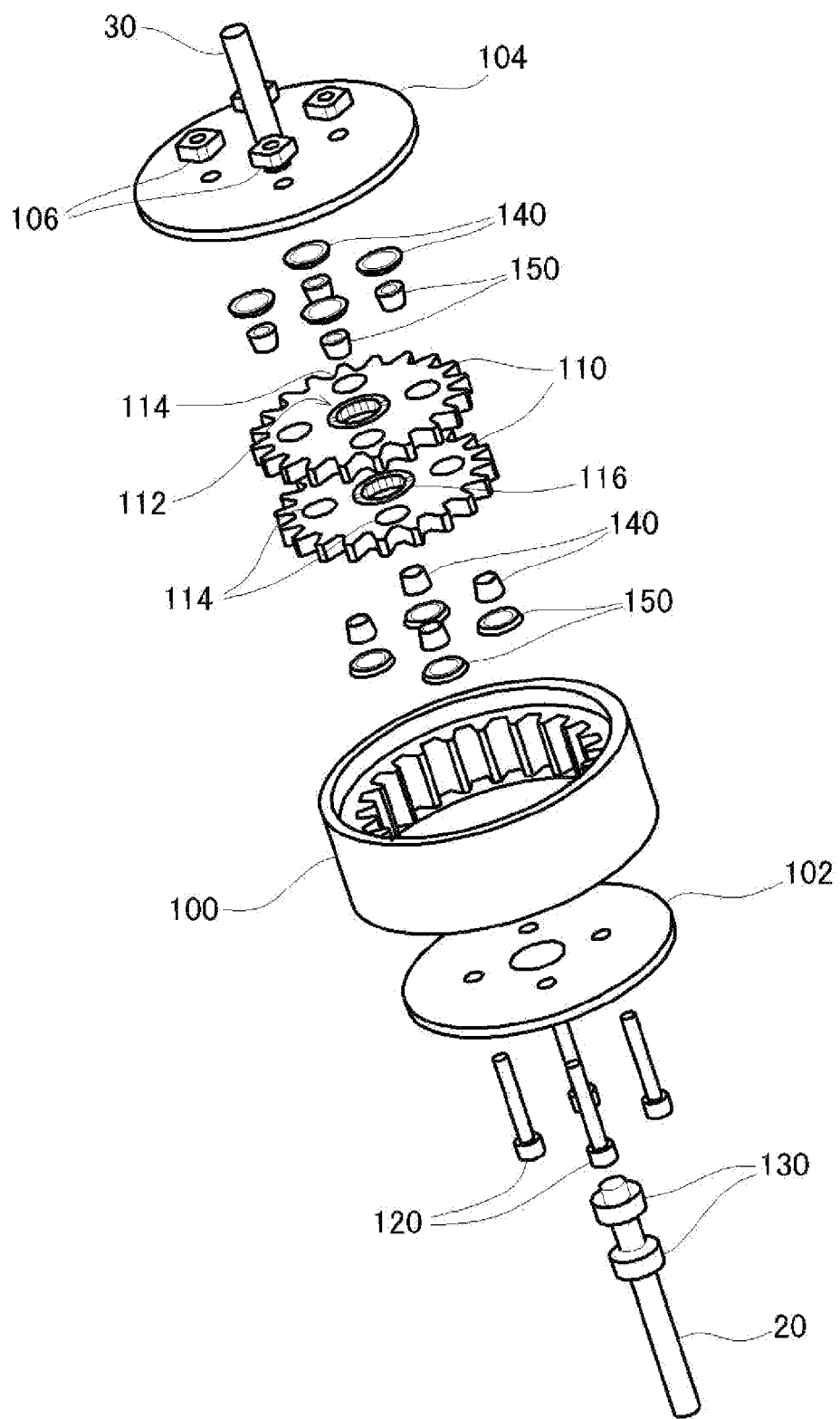
FIG. 2 is an exploded perspective view illustrating an internal structure of a speed reducer according to an embodiment of the invention.

FIG. 2 is an exploded perspective view illustrating an internal structure of the speed reducer 10 according to the present embodiment. As shown in the figure, in the speed reducer 10 of the present embodiment, a plurality of gear teeth is formed on an inner circumference (hereinafter, also referred to as an inner circumferential side) of a cylindrical member which forms an outer circumference of the main body section 40, to form a ring gear 100. Further, a revolving gear 110 which is smaller in size than the ring gear 100 and which is formed with a plurality of gear teeth on an outer circumference (hereinafter, also referred to as an outer circumferential side) is installed inside the ring gear 100. A shaft hole 112 is formed in the center of the revolving gear 110, and an eccentric cam 130 (circular cam) which is installed in the input shaft 20 is inserted in the shaft hole 112 to be able to rotate through a bearing 116. In the speed reducer 10 of the present embodiment, two revolving gears 110 are installed inside the ring gear 100, which will be described in detail.

Further, through holes 114 are installed in four locations on a concentric circle, when seen from the center of the revolving gear 110, in the revolving gear 110. A penetration pin 120 for extracting the rotating motion of the revolving gear 110 is inserted in each through hole 114. A method of extracting the rotating motion of the revolving gear 110 by the penetration pin 120 will be described later. These penetration pins 120 are attached to a lower cover plate 102 which forms a lower surface of the main body section 40 at their lower end portions, and are fixed to the upper cover plate 104 which forms an upper surface of the main body section 40 by a nut 106 at their upper end portions.

Further, in the speed reducer 10 of the present embodiment, a plurality of wedge members 140 (sliding members) and disc springs 150 (biasing member) are engaged with the penetration pins 120. The reason why these wedge members 140 and the disc springs 150 are installed will be described later.

FIGS. 3A to 3I are diagrams illustrating an operation principle of the speed reducer 10 of the present embodiment. As described above with reference to FIG. 2, the revolving gear 110 which is smaller in size than the ring gear 100 is installed inside the ring gear 100, and the ring gear 100 and the revolving gear 110 are engaged with each other in one location. Accordingly, the revolving gear 110 is in a state of being eccentric to the central position of the ring gear 100. Further, the shaft hole 112 is formed in the center of the revolving gear 110, and the eccentric cam 130 is inserted in the shaft hole 112 through the bearing 116 (see FIG. 2). Thus, if the input shaft 20 rotates, the eccentric cam 130 rotates, which generates a revolving motion centering around the input shaft 20 (and central axis of the ring gear 100) in the revolving gear 110. In the present description, "revolution" means that an object revolves around the periphery of a certain point.

Further, the revolving gear 110 and the eccentric cam 130 are be able to rotate with respect to each other through the bearing 116, and the revolving gear 110 is engaged with the ring gear 100 by the gear teeth. Thus, while rotating by the engagement with the gear teeth of the ring gear 100, the revolving gear 110 revolves around the input shaft 20 (and the central axis of the ring gear 100). In this description, "rotation" means a rotating motion using an axis which passes an inner point of a certain object (for example, center or weighted center) as a central axis. For example, in the case of the present embodiment, "rotation" means a rotating motion using an axis which passes the center (not shown) of the revolving gear 110 as a central axis.

Figure 3:
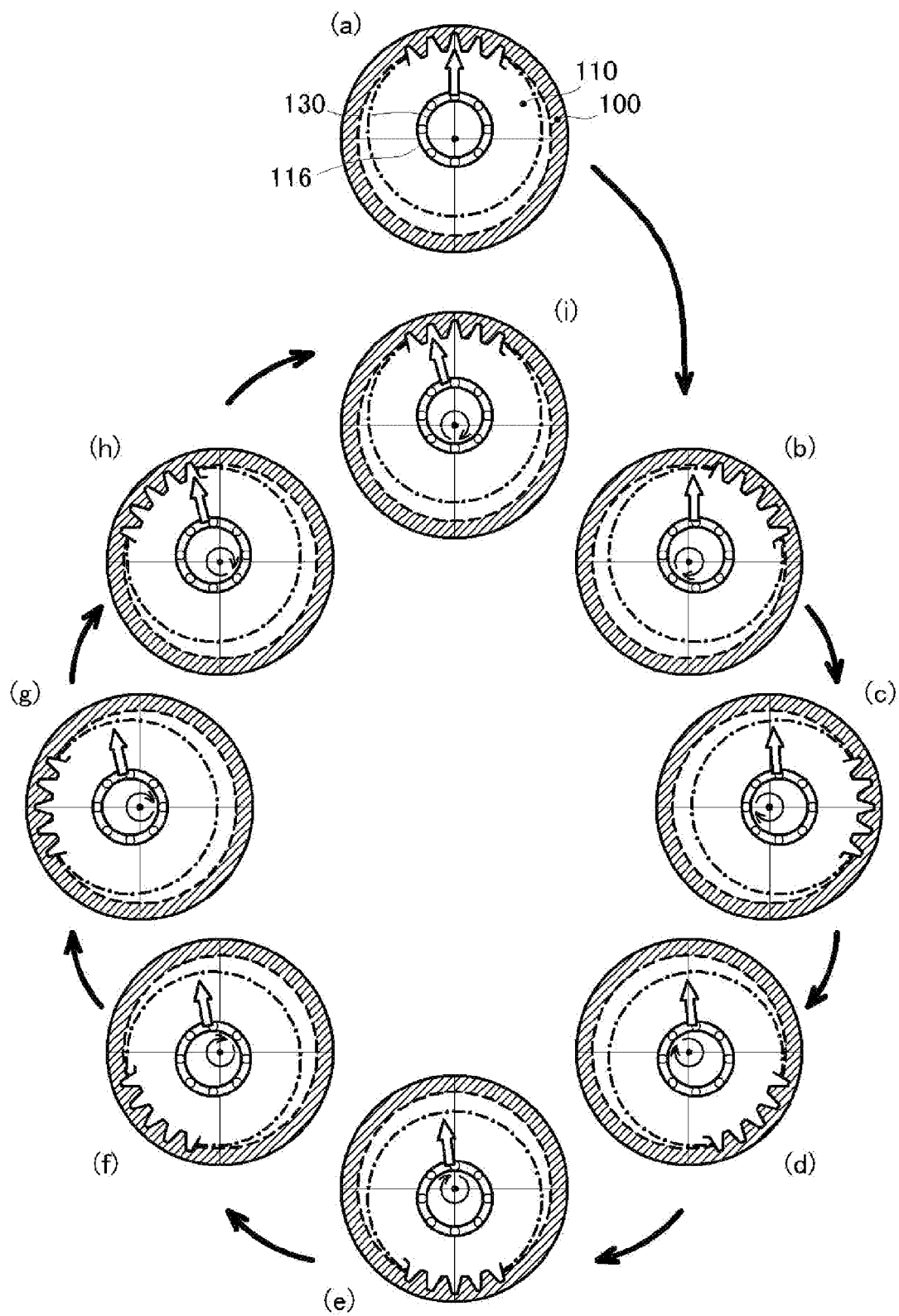
FIGS. 3A to 3I are diagrams illustrating an operation principle of a speed reducer according to an embodiment of the invention.

FIG. 3A shows a state where the eccentric cam 130 is eccentric on the upper side of the figure and accordingly the revolving gear 110 is engaged with the ring gear 100 on the upper side of the figure. In FIGS. 3A to 3I, an arrow is drawn on a side surface of the revolving gear 110 to confirm a state where the revolving gear 110 rotates. This arrow indicates a central uppermost portion in the figure in the state of FIG. 3A.

If the input shaft 20 rotates by 45 degrees in the clockwise direction from the state shown in FIG. 3A, the revolving gear 110 also revolves by 45 degrees in the clockwise direction by the motion of the eccentric cam 130. Further, since the revolving gear 110 is engaged with the ring gear 100, the revolving gear 110 rotates in the anticlockwise direction by an angle corresponding to the number of gear teeth. As a result, the revolving gear 110 becomes in a state shown in FIG. 3B. As is obvious from comparison of FIG. 3A and FIG. 3B, as the eccentric cam 130 rotates by 45 degrees in the clockwise direction, the revolving gear 110 also revolves by 45 degrees in the clockwise direction, and moves to an eccentric position on an upper right side in the figure. Further, the direction of the arrow drawn in the revolving gear 110 indicates an approximately uppermost portion in the figure in a similar way to FIG. 3A. It can be considered that this is caused because the rotation in the anticlockwise direction generated in the revolving gear 110 by the engagement with the ring gear 100 approximately negates the revolution in the clockwise direction when the revolving gear 110 revolves in the clockwise direction.

If the input shaft 20 further rotates by 45 degrees in the clockwise direction from the state shown in FIG. 3B, the revolving gear 110 moves to a position shown in FIG. 3C. This state is a state where the revolving gear 110 revolves by 90 degrees in the clockwise direction with respect to the state shown in FIG. 3A. Further, as the revolving gear 110 revolves to this position while being engaged with the ring gear 100, the revolving gear 110 rotates in the anticlockwise direction by an angle corresponding to the number of gear teeth. Further, the direction of the arrow drawn in the revolving gear 110 is still in a state of indicating an approximately uppermost portion in the figure, in a similar way to FIG. 3B.

If the input shaft 20 further rotates in the clockwise direction from the state shown in FIG. 3C, the revolving gear 110 moves to a state shown in FIG. 3D, a state shown in FIG. 3E, a state shown in FIG. 3F, and a state shown in FIG. 3H. Here, if the input shaft 20 rotates just one turn, it becomes in a state shown in FIG. 3I. Further, the direction of the arrow drawn in the revolving gear 110 rotates in the anticlockwise direction by the difference in the number of teeth between the revolving gear 110 and the ring gear 100, compared with the state of FIG. 3A. For example, the number of teeth of the revolving gear 110 is smaller than the number of teeth of the ring gear 100 by one, the revolution in the clockwise direction and the rotation in the anticlockwise direction generated in the revolving gear 110 have angles which are approximately negated with respect to each other. However, strictly speaking, the angle of the rotation is larger than that of the revolution by one gear tooth for each revolution. This is because, since the number of gear teeth of the revolving gear 110 is smaller than the number of gear teeth of the ring gear 100 by one tooth, the revolving gear 110 should further rotate in the anticlockwise direction once and by one tooth so that the revolving gear 110 revolves once in the clockwise direction while being engaged with the ring gear 100.

In this way, in the speed reducer 10 according to the present embodiment, if the input shaft 20 rotates once, the revolving gear 110 rotates reversely by the number of gear teeth corresponding to the gear teeth number difference with the ring gear 100. For example, if the number of gear teeth of the ring gear 100 is 50 and the number of gear teeth of the revolving gear 110 is 49, the revolving gear 110 rotates reversely by one fiftieth turn whenever the input shaft 20 rotates once (accordingly, 360 degrees/50=7.2 degrees).

Further, the motion of the revolving gear 110 when the input shaft 20 rotates may be performed as follows. Firstly, if the input shaft 20 rotates, the revolving gear 110 revolves around the input shaft 20 (and the central axis of the ring gear 100) by the eccentric cam 130. On the other hand, since the revolving gear 110 is engaged with the ring gear 100, the revolving gear 110 rotates while rolling on the ring gear 100.

Here, the revolving gear 110 is formed to be slightly smaller in size than the ring gear 100. Accordingly, even though the revolving gear 110 does not approximately rotate in reality, the revolving gear 110 can roll on the ring gear 100, only by slightly moving the revolving gear 110 in parallel. For example, in the states shown in FIGS. 3A and 3B, the revolving gear 110 scarcely rotates and slightly moves in a right lower direction. Nevertheless, the position where the revolving gear 110 is engaged with the ring gear 100 moves by 45 degrees from the central position of the ring gear 100. That is, the revolving gear 110 rolls on the ring gear 100. Similarly, in the states shown in FIGS. 3B and 3C, the revolving gear 110 scarcely rotates and slightly moves in the approximately right lower direction. Nevertheless, the position where the revolving gear 110 is engaged with the ring gear 100 further moves by 45 degrees. That is, the revolving gear 110 rolls on the ring gear 100.

In this way, if the revolving gear 110 is formed to be slightly smaller in size than the ring gear 100, it is possible to allow the revolving gear 110 to roll on the ring gear 100 almost without rotation, only by moving (fluctuating) the revolving gear 110 to vibrate and rotate. Further, during a period when the revolving gear 110 returns to the original position (for example, the position shown in FIG. 3A or 3I), only rotation of the angle corresponding to the gear teeth number difference between the ring gear 100 and the revolving gear 110 is generated.

If the input shaft 20 rotates once as described above, the revolving gear 110 fluctuates once. This shows that the revolving gear 110 severely fluctuates if the input shaft 20 rotates at high speed, and accordingly, it is likely that vibration is generated. However, as described above, two revolving gears 110 are installed (see FIG. 2) in the speed reducer 10 of the present embodiment, and these revolving gears 110 revolve to deviate from each other by a half cycle. Thus, the vibration generated by the fluctuation of the one revolving gear 110 is negated by the vibration due to the fluctuation of the other revolving gear 110, and thus, it is possible to prevent vibration from occurring in the entire speed reducer 10.

As described above, even though the revolving gears 110 of the present embodiment revolves, the revolving gears 110 only slightly fluctuate inside the ring gear 100 while slightly rotating. In this view, it can be considered that the rotation of the revolving gear 110 is extracted by the penetration pin 120. That is, as shown in FIG. 2, as an example, four through holes 114 are installed in the revolving gear 110 of the present embodiment, and the penetration pins 120 are respectively inserted in the through holes 114. Here, if the size of the though hole 114 is set to be larger than the diameter of the penetration pin 120 to a certain degree, it is possible to absorb the fluctuating motion of the revolving gear 110 inside the ring gear 100 by the gap (clearance) between the through hole 114 and the penetration pin 120, to thereby extract only the rotation of the revolving gear 110. Hereinafter, this will be described.

Figure 4:
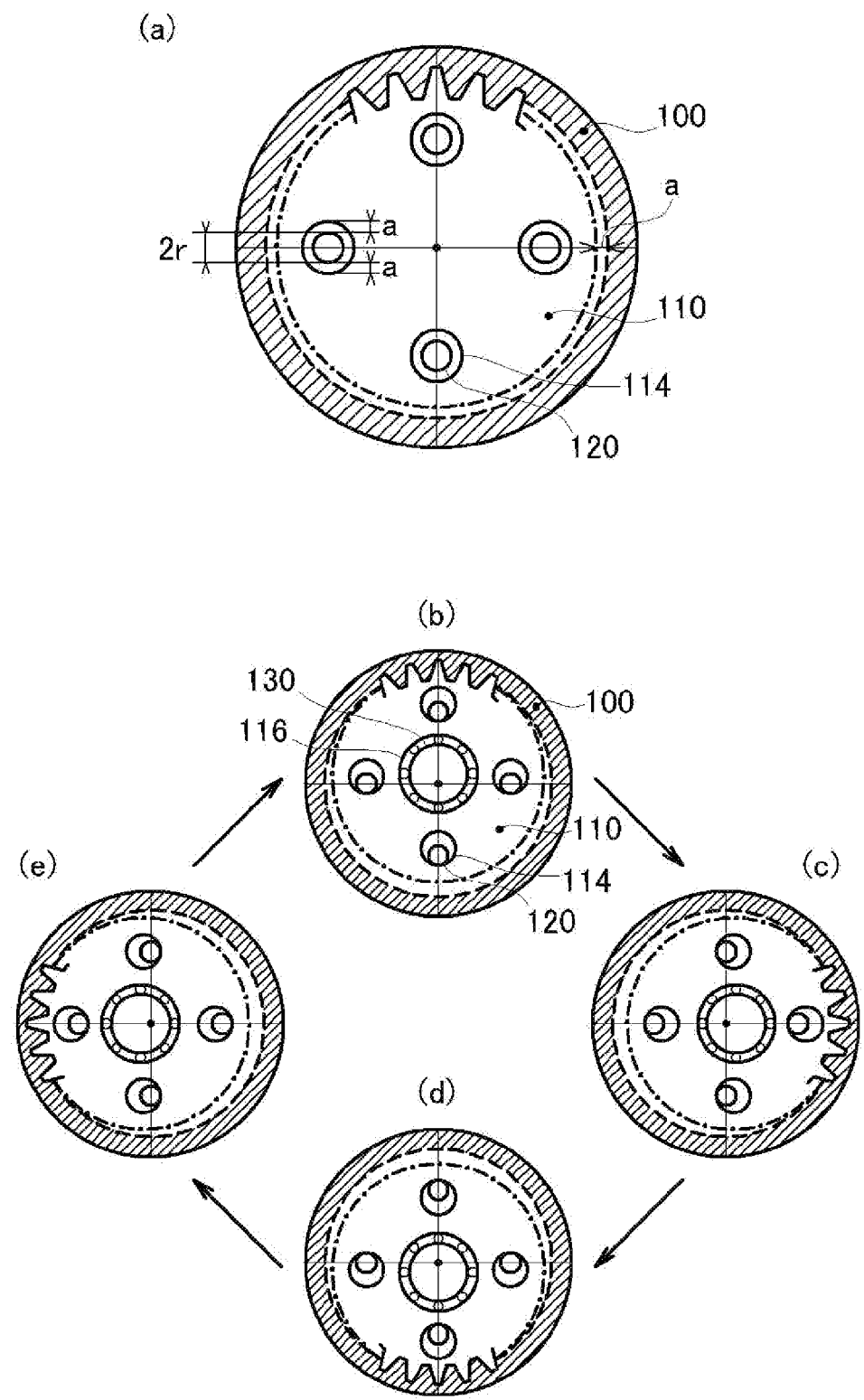
FIGS. 4A to 4E are diagrams illustrating a state where rotation of a revolving gear is extracted by penetration pins.

FIGS. 4A to 4E are diagrams illustrating a state where the rotation of the revolving gear 110 is extracted by the penetration pin 120. Firstly, the size of the through hole 114 will be described. As shown in FIG. 4A, when the central position of the revolving gear 110 coincides with the central position of the ring gear 100, the through hole 114 overlaps with the position of the penetration pin 120 and is formed to be larger than the penetration pin 120 by a radius "a". Here, "a" represents the amount of eccentricity of the revolving gear 110 with respect to the central position of the ring gear 100.

The revolving gear 110 which is formed with the through holes 114 in this way is eccentric toward the upper side in the figure by the eccentric cam 130. Then, since the revolving gear 110 is eccentric toward the upper direction by the length "a", as shown in FIG. 4B, the lower side of the through hole 114 becomes in contact with an outer circumference of the penetration pin 120.

Further, if the revolving gear 110 is eccentric toward the right side in the figure by the eccentric cam 130, as shown in FIG. 4C, the left side of the through hole 114 becomes in contact with the penetration pin 120. Similarly, if the revolving gear 110 is eccentric toward the lower side in the figure, as shown in FIG. 4D, the upper side of the through hole 114 becomes in contact with penetration pin 120, and if the revolving gear 110 is eccentric toward the left side in the figure, as shown in FIG. 4E, the through hole 114 and the penetration pin 120 are in contact with each other on the right side of the through hole 114.

In this way, in the speed reducer 10 of the present embodiment, by setting the size of the through hole 114 to be larger than the penetration pin 120 by the size corresponding to the amount of eccentricity "a", it is possible to absorb the fluctuating motion of the revolving gear 110 inside the ring gear 100. "Setting the size of the through hole 114 to be larger than the penetration pin 120 by the size corresponding to the amount of eccentricity "a"" means that the radius of the through hole 114 is set to be larger than the radius of the penetration pin 120 by the amount of eccentricity "a" or the diameter of the through hole 114 is set to be larger than two times ($2a$) the amount of eccentricity "a" than the diameter of the penetration pin 120. On the other hand, if the revolving gear 110 rotates, since the position of the through hole 114 moves, this motion is transmitted to the penetration pin 120. Thus, it is possible to extract the rotating motion of the revolving gear 110.

The rotation of the extracted revolving gear 110 in this way is transmitted to the upper cover plate 104 and the lower cover plate 102 (see FIG. 2) of the main body section 40 to which the penetration pin 120 is attached. As a result, the rotation of the revolving gear 110 from the output shaft 30 which is fixed to the upper cover plate 104 is output to the outside of the speed reducer 10.

Here, as is obvious from FIGS. 4B to 4E, if the revolving gear 110 fluctuates inside the ring gear 100, the through holes 114 and the penetration pins 120 are in contact with each other in any one location, and its contact location constantly moves. Accordingly, if any one location where the clearance between the through hole 114 and the penetration pin 120 is excessively small is present, the through hole 114 and the penetration pin 120 interfere with each other, and thus, the speed reducer 10 becomes in a locked state. Since it is not possible to avoid a slight manufacturing error when manufacturing the through hole 114 or the penetration pin 120, it is necessary to slightly increase the clearance between the through hole 114 and the penetration pin 120 in order to prevent such a problem.

Thus, in the speed reducer 10 having such an operational principle in the present embodiment, due to the gap between the through hole 114 and the penetration pin 120, there is a problem that torque transmission between the through hole 114 and the penetration pin 120 is delayed to cause a period when an output torque cannot not obtained, or the output shaft 30 rattles even though the input shaft 20 is stopped. Thus, in the speed reducer 10 according to the present embodiment, by adopting a structure in which the wedge member 140 is disposed between the through hole 114 and the penetration pin 120, such a problem is suppressed or prevented.

Figure 5:
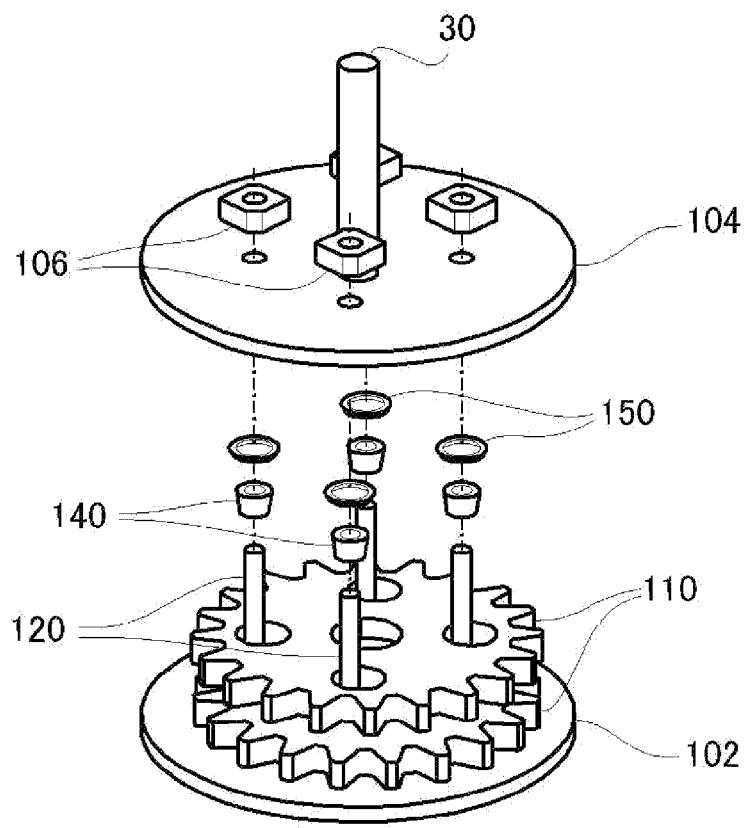
FIG. 5 is a diagram illustrating a state where wedge members are assembled to through holes and penetration pins.

B. Mechanism of Removing Gap Between Through Hole and Penetration Pin by Wedge Member FIG. 5 is a diagram illustrating a state where the wedge members 140 are assembled to the through holes 114 and the penetration pins 120. In FIG. 5, the wedge members 140 and the like are already assembled to the lower revolving gear 110, and the wedge members 140, the disc springs 150, the upper cover plate 104 and the like are being assembled to the upper revolving gear 110. Hereinafter, a method of assembling the wedge members 140 and the like to the upper revolving gear 110 will be described, but the wedge members 140 and the like can also be assembled to the lower revolving gear 110 in a similar manner.

As shown in the figure, in the speed reducer 10 of the present embodiment, four through holes 114 are formed in the revolving gear 110, and the penetration pin 120 is inserted into each through hole 114. The wedge members 140 (sliding member) are engaged with the penetration pins 120 one by one. The wedge member 140 has a shape (circular truncated cone shape) in which a tip end of a conical member is cut. For example, the "circular truncated cone shape" may be a shape which at least includes a circular cross section which is, from one end surface toward the other end surface, in parallel with the end surfaces. At a location corresponding to a rotational axis of a circular truncated cone, a through hole (through portion) having an inner diameter allowing sliding of the penetration pin 120 is formed. Further, the through holes 114 of a bowl shape are formed in the revolving gear 110 of the present embodiment. Here, "bowl shape" is a taper shape, for example, and the size of the through hole 114 becomes small from one opening portion of the through hole 114 toward the other opening portion thereof. The through hole 114 of a bowl shape which becomes wide upward is formed in the revolving gear 110 which is shown on the upper side in FIG. 5, and the through hole 114 of a bowl shape which becomes wide downward is formed in the revolving gear 110 on the lower side in FIG. 5. Further, the angle of the inclined surface of the through hole 114 is the same as the angle of the inclined surface of the wedge member 140. Thus, as shown in FIG. 5, in a state where the penetration pins 120 protrude from the through holes 114 of the upper revolving gear 110, if the wedge members 140 are inserted into the penetration pins 120 from the upper side, the wedge members 140 slide down along the penetration pins 120, and then the inclined surfaces of the wedge members 140 is stopped while being in contact with the inclined surfaces of the through holes 114. In this state, the rear end of the wedge member 140 is formed to be in the approximately same surface position with respect to the end surface of the revolving gear 110 in which the through hole 114 is opened.

In this way, after the wedge member 140 is engaged with each of four penetration pins 120, the disc spring 150 (bias member) of a circular shape is engaged with each penetration pin 120 from the top of the wedge member 140, and then, the upper cover plate 104 is installed. Thereafter, a nut 106 is coupled to the penetration pin 120 which protrudes from the upper cover plate 104, to thereby complete assembly of the speed reducer 10.

As described above, in a state where the speed reducer 10 is assembled, the upper cover plate 104 is in a state of being pressed toward the inclined surfaces of the through holes 114 of the upper revolving gear 110 through the disc springs 150 and the wedge members 140, and is not in contact with the ring gear 100. Similarly, the lower cover plate 102 is in a state of being pressed toward the inclined surfaces of the through holes 114 of the lower revolving gear 110 through the disc springs 150 and the wedge members 140, and is not in contact with the ring gear 100. Thus, if the nuts 106 are fastened, the upper cover plate 104 and the lower cover plate 102 are close to each other, and the disc springs 150 are deformed to such a degree to press the wedge members 140 against the inclined surfaces of the through holes 114 with a strong force. In other words, the force of pressing the wedge members 140 against the inclined surfaces of the through holes 114 can be adjusted by a force of fastening the nuts 106.

Figure 6:
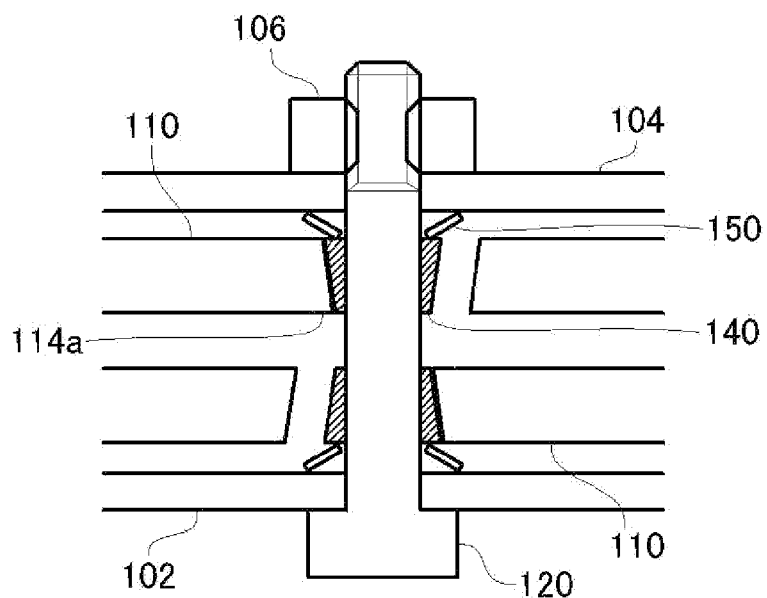
FIG. 6 is a diagram illustrating a state where wedge members are assembled in through holes, as a sectional view taken along a central axis of a certain penetration pin.

FIG. 6 is a diagram illustrating a state where the wedge members 140 are assembled to the through holes 114, as a sectional view taken along the central axis of a certain penetration pin 120. As shown in the figure, the wedge members 140 and the through holes 114 are in contact with each other in the inclined surfaces thereof. Since the penetration pin 120 are eccentric with respect to the through holes 114, the wedge members 140 are also eccentric with respect to the through holes 114. Further, the end surface of each wedge member 140 on the rear side (side where the end becomes thick) becomes the approximately same surface position as the end surface of the revolving gear 110. Further, the rear end surface of the wedge member 140 is biased by the disc spring 150, and thus, the wedge member 140 is in a state of being constantly pressed against the inclined surface of the through hole 114.

Figure 7A:
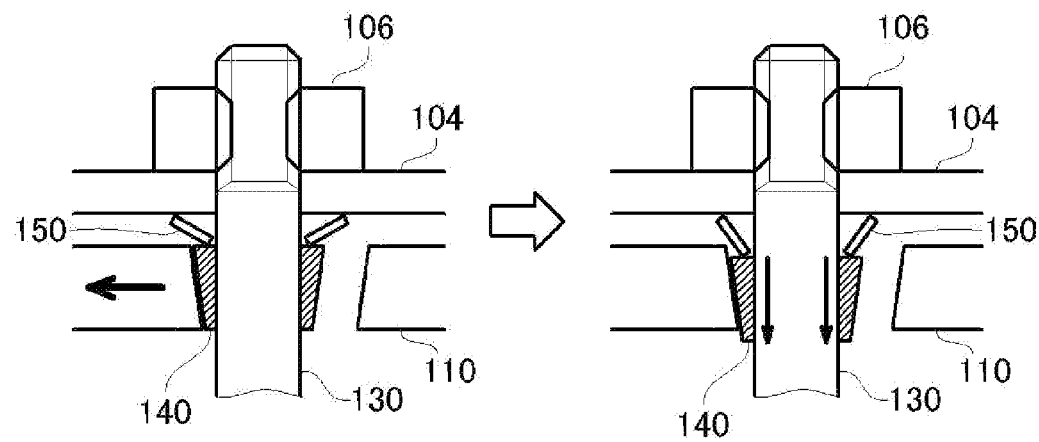
FIGS. 7A and 7B are diagrams illustrating a mechanism in which a gap between a through hole and a penetration pin is removed by a wedge member in a speed reducer according to an embodiment of the invention.
Figure 7B:
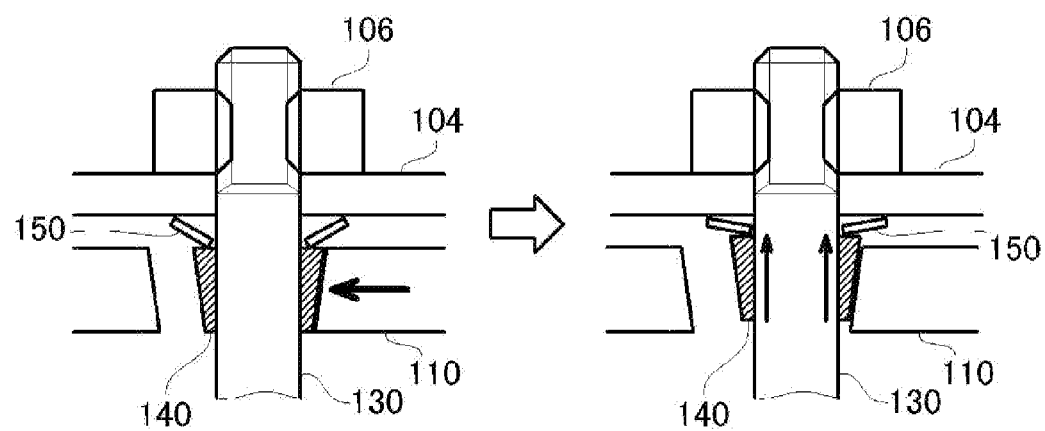

FIGS. 7A and 7B are diagrams illustrating a mechanism where the speed reducer 10 according to the present embodiment removes the gap between the through hole 114 and the penetration pin 120 by the wedge member 140. As described above, the penetration pin 120 (and the wedge member 140) is eccentric with respect to the through hole 114, and the wedge member 140 and the through hole 114 are in contact with each other at one location. However, if the revolving gear 110 revolves, the penetration pin 120 moves in the through hole 114. Further, since a manufacturing error is present in the through hole 114, when the penetration pin 120 moves in the through hole 114, the distance between the through hole 114 and the penetration pin 120 may be increased or decreased.

FIG. 7A shows a case where the inclined surface of the through hole 114 moves away from the penetration pin 120 by the revolution of the revolving gear 110. In this way, even in a case where the inclined surface of the through hole 114 moves away from the penetration pin 120, the wedge member 140 which is biased by the disc spring 150 moves and is pressed against the inclined surface of the through hole 114. Thus, the gap is prevented from being generated between the through hole 114 and the wedge member 140.

FIG. 7B shows a case where the inclined surface of the through hole 114 moves close to the penetration pin 120 by the revolution of the revolving gear 110. In this way, if the inclined surface of the through hole 114 moves close to the penetration pin 120, a force of pushing up the wedge member 140 from the inclined surface of the through hole 114 is generated. Further, since the wedge member 140 is pressed only by the disc spring 150, the wedge member 140 moves in a direction of slipping out of the through hole 114 by the force from the inclined surface of the through hole 114. Thus, the through hole 114 and the wedge member 140 interfere with each other, to thereby prevent the speed reducer 10 from being in the locked state. Even though the wedge member 140 moves in the direction of slipping out of the through hole 114, the gap is not generated between the through hole 114 and the wedge member 140.

Hereinbefore, a case where position deviation of the through hole 114 is generated due to a manufacturing tolerance has been described as an example, but even in a case where position deviation of the penetration pin 120 is generated due to a manufacturing tolerance or in a case where the inner circumference of the through hole 114 (or the outer circumference of the penetration pin 120) cannot be formed in a perfect circular shape, the interval between the through hole 114 and the penetration pin 120 may be increased or decreased. Even in such a case, if the through hole 114 and the penetration pin 120 are in contact with each other through the wedge member 140 as described above, the gap can be filled by the wedge member 140 in a portion where the interval between the through hole 114 and the penetration pin 120 is increased, and the wedge member 140 can slip out of the through hole 114 in a portion where the interval is decreased.

As described above, in the speed reducer 10 of the present embodiment, the through hole 114 and the penetration pin 120 can be constantly in contact with each other through the wedge member 140. As a result, it is possible to prevent occurrence of a period when the torque transmission is delayed and the output torque cannot be obtained or the rattling of the output shaft 30 due to the gap generated between the through hole 114 and the penetration pin 120. If the interval between the through hole 114 and the penetration pin 120 is decreased, the wedge member 140 slips out of the through hole 114 to prevent the through hole 114 and the wedge member 140 from interfering with each other, thereby preventing the speed reducer 10 from being in the locked state.

C. Modified Example

In the speed reducer 10 of the embodiment as described above, the portion where the wedge member 140 is in contact with the through hole 114 is formed in the bowl shape. Here, instead of forming the inner circumference of the through hole 114 in the bowl shape, a bowl shaped member may be separately prepared and may be inserted in the inner circumference of the through hole 114. In the modified example described below, the same components as in the above-described embodiment are given the same reference numerals as in the embodiment, and its detailed description is omitted.

Figure 8:
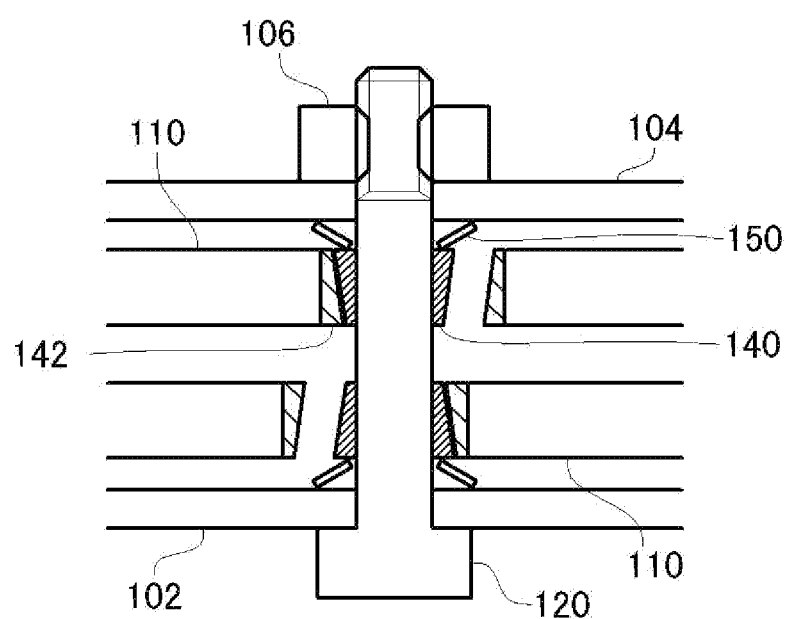
FIG. 8 is an enlarged view illustrating a peripheral state of through holes in a speed reducer according to a modified example.

FIG. 8 is an enlarged view illustrating a peripheral state of the through hole 114 of the speed reducer 10 according to the modified example. The through holes 114 of the modified example are obtained by forming circular holes in the revolving gear 110. Further, a wedge receiving member 142 which has an approximately tubular shape and has an inner circumference of a bowl shape is inserted in the through hole 114.

In the speed reducer 10 of the above-described modified example, since the wedge member 140 and the wedge receiving member 142 are constantly in contact with each other, it is possible to prevent the above-described problem due to the gap generated between the through hole 114 and the penetration pin 120. Further, if the wedge receiving member 142 and the revolving gear 110 are separately formed in this way, the circular hole for installing the wedge receiving member 142 has only to be opened in the revolving gear 110, and it is thus possible to easily process the revolving gear 110. Further, since the wedge receiving member 142 can be formed by press working or the like, there is no difficulty in processing. Further, if the wedge receiving member 142 is formed of a member which is strong against abrasion, even though the wedge member 140 and the wedge receiving member 142 are in friction, it is possible to prevent the wedge receiving member 142 from being deformed by friction.

D. Application Example

As described above, in the speed reducer 10 according to the present embodiment, the gap is not generated in the contact portion of the through hole 114 and the penetration pin 120, and it is thus possible to prevent the output delay or rattling of the output shaft 30. Thus, the speed reducer 10 according to the present embodiment is particularly suitable as a speed reducer which is installed to a portion where a precise operation is necessary, such as a joint of a robot hand.

Figure 9A:
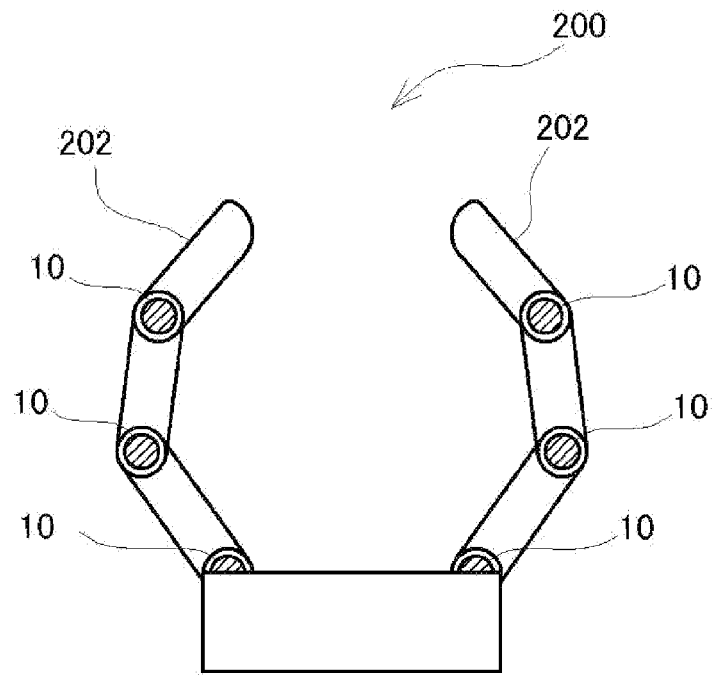
FIGS. 9A and 9B are diagrams illustrating a state where a speed reducer according to an embodiment of the invention is assembled to a joint or the like of a robot hand.
Figure 9B:
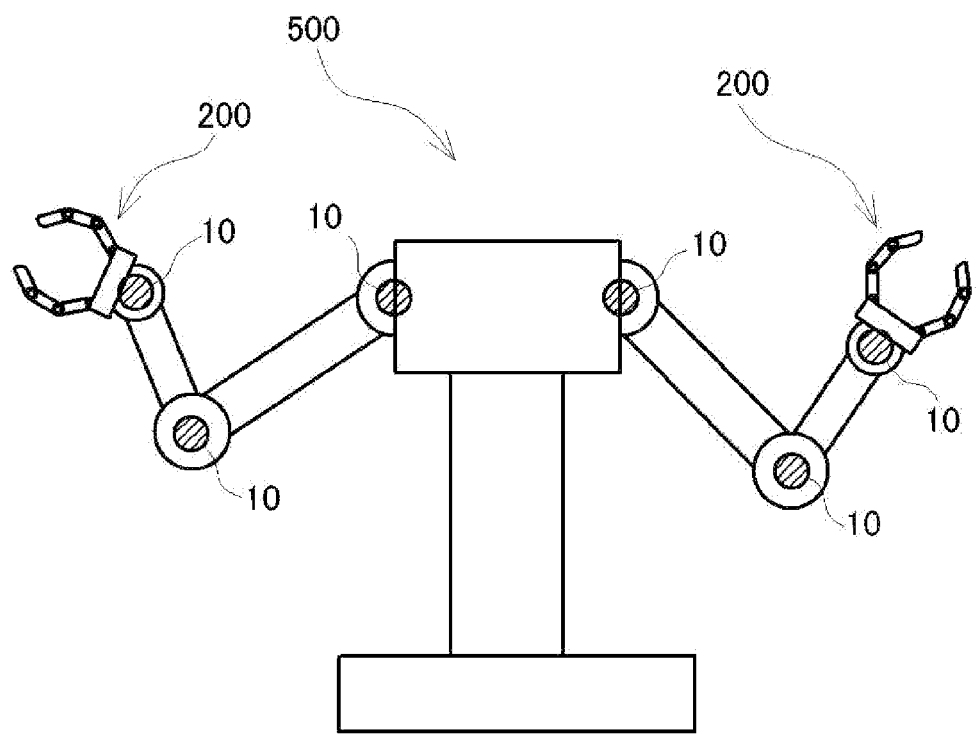

FIGS. 9A and 9B are diagrams illustrating a state where the speed reducer 10 according to the present embodiment is assembled in a joint or the like of a robot hand. In a robot hand 200 shown in FIG. 9A, joints are installed at three locations of each of two fingers 202 which face each other, and the speed reducers 10 are assembled to the joints. Further, in a robot 500 shown in FIG. 9B, the speed reducers 10 are assembled in a connection portion between an arm of the robot and the robot hand 200, an elbow of the arm, a base of the arm, or the like. Thus, output delay of the joints in which the speed reducers 10 are assembled or rattling of the output shaft 30 is prevented, thereby making it possible to smoothen the motion of the joints.

Hereinbefore, the speed reducer according to the embodiment has been described, but the invention is not limited thereto and may have a variety of embodiments in a range without departing from the spirit of the invention.

The entire disclosure of Japanese Patent Application No. 2011-062532, filed Mar. 22, 2011 is expressly incorporated by reference herein.

What is claimed is:
1. A speed reducer comprising:
a ring gear which is formed with a plurality of gear teeth on the inner circumference thereof;
a revolving gear which is formed with a plurality of gear teeth on the outer circumference thereof and is engaged with the ring gear;
a circular cam which is disposed to be able to rotate with respect to the revolving gear in a central position of the revolving gear;
a first rotational shaft which is installed in the circular cam, is disposed on the central axis of the ring gear, and rotates the circular cam around the central axis to revolve the revolving gear around the central axis;
a penetration pin which is inserted in a through hole formed in the revolving gear;
a second rotational shaft which is disposed on the central axis of the ring gear, is connected to the penetration pin, and outputs its rotation according to the rotation of the revolving gear;
a sliding member which has a hollow circular tube shape, is engaged with the outer circumference of the penetration pin to be able to slide thereon, and has a shape which becomes thin toward its one end; and
a biasing member which biases the sliding member in a direction where the shape becomes thin to be in contact with the inner circumference of the through hole,
wherein the inner circumference of the through hole of the revolving gear has a shape which becomes narrow toward its one end.
2. The speed reducer according to claim 1,
wherein the through hole of the revolving gear is formed by inserting a member which is different from the revolving gear into the revolving gear.
3. A robot hand comprising the speed reducer according to claim 1.
4. A robot hand comprising the speed reducer according to claim 2.
5. A robot comprising the speed reducer according to claim 1.
6. A robot comprising the speed reducer according to claim 2.
7. A speed reducer comprising:
a ring gear which is formed with a plurality of gear teeth on the inner circumference thereof;

a revolving gear which is formed with a plurality of gear teeth on the outer circumference thereof and is engaged with the ring gear;

a circular cam which is disposed to be able to rotate with respect to the revolving gear in a central position of the revolving gear;

a first rotational shaft which is installed in the circular cam, is disposed on the central axis of the ring gear, and rotates the circular cam around the central axis to revolve the revolving gear around the central axis;

a penetration pin which is inserted in a through hole formed in the revolving gear;

a second rotational shaft which is disposed on the central axis of the ring gear, is connected to the penetration pin, and outputs its rotation due to the rotation of the revolving gear;

a sliding member which has a through portion formed from one end surface of its circular truncated cone shape to the other end surface thereof, and in which the outer circumference of the penetration pin is inserted in the through portion to be able to slide therein; and a biasing member which biases the sliding member to be in contact with the inner circumference of the through hole, wherein the inner circumference of the through hole of the revolving gear has a tapered shape.

8. A robot comprising:

a ring gear which is formed with a plurality of gear teeth on the inner circumference thereof;

a revolving gear which is formed with a plurality of gear teeth on the outer circumference thereof and is engaged with the ring gear;

a circular cam which is disposed to be able to rotate with respect to the revolving gear in a central position of the revolving gear;

a first rotational shaft which is installed in the circular cam, is disposed on the central axis of the ring gear, and rotates the circular cam around the central axis to revolve the revolving gear around the central axis;

a penetration pin which is inserted in a through hole formed in the revolving gear;

a second rotational shaft which is disposed on the central axis of the ring gear, is connected to the penetration pin, and outputs its rotation due to the rotation of the revolving gear;

a sliding member which has a through portion formed from one end surface of its circular truncated cone shape to the other end surface thereof, and in which the outer circumference of the penetration pin is inserted in the through portion to be able to slide therein; and a biasing member which biases the sliding member to be in contact with the inner circumference of the through hole, wherein the inner circumference of the through hole of the revolving gear has a tapered shape.

9. The robot according to claim 8, wherein a member which is formed with the through hole and is different from the revolving gear is inserted in the revolving gear.

\* \* \* \* \*